US006622479B2

(12) United States Patent
Kakuyama et al.

(10) Patent No.: US 6,622,479 B2
(45) Date of Patent: Sep. 23, 2003

(54) ENGINE EXHAUST PURIFICATION DEVICE

(75) Inventors: Masatomo Kakuyama, Yokohama (JP);
Shigeaki Kakizaki, Yokohama (JP);
Osamu Matsuno, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/958,983

(22) PCT Filed: Feb. 23, 2001

(86) PCT No.: PCT/JP01/01365

§ 371 (c)(1),
(2), (4) Date: Oct. 16, 2001

(87) PCT Pub. No.: WO01/63110

PCT Pub. Date: Aug. 30, 2001

(65) Prior Publication Data

US 2002/0157380 A1 Oct. 31, 2002

(30) Foreign Application Priority Data

Feb. 24, 2000 (JP) ........................................ 2000-047943

(51) Int. Cl.$^7$ ................................................. F01N 3/00
(52) U.S. Cl. .............................. 60/285; 60/274; 60/276
(58) Field of Search .......................... 60/274, 285, 276, 60/299

(56) References Cited

U.S. PATENT DOCUMENTS

| 5,207,056 | A | | 5/1993 | Benninger ..................... 60/274 |
|---|---|---|---|---|
| 5,228,286 | A | | 7/1993 | Demura ........................ 60/276 |
| 5,438,826 | A | | 8/1995 | Blischke et al. ............... 60/276 |
| 5,609,023 | A | | 3/1997 | Katoh et al. ................... 60/276 |
| 5,661,972 | A | * | 9/1997 | Katoh et al. ................... 60/276 |
| 5,839,274 | A | * | 11/1998 | Remboski et al. ............. 60/276 |
| 5,842,340 | A | | 12/1998 | Bush et al. .................... 60/274 |
| 5,941,211 | A | | 8/1999 | Brehob et al. ............... 123/325 |
| 6,003,308 | A | | 12/1999 | Tsutsumi et al. .............. 60/276 |
| 6,116,021 | A | * | 9/2000 | Schumacher et al. ....... 123/674 |
| 6,185,933 | B1 | * | 2/2001 | Tsuzuki et al. ............... 60/285 |
| 6,226,982 | B1 | * | 5/2001 | Poggio et al. ................ 60/276 |
| 6,289,673 | B1 | | 9/2001 | Tayama et al. ............... 60/285 |
| 6,336,320 | B1 | * | 1/2002 | Tanaka et al. ................ 60/277 |

FOREIGN PATENT DOCUMENTS

| DE | 44 10 489 C1 | | 10/1995 |
|---|---|---|---|
| JP | 07-259602 | * | 10/1995 |
| JP | 9-228873 | | 9/1997 |
| JP | 2000120475 A | | 4/2000 |

OTHER PUBLICATIONS

T. Demura, 01–257738, "Control Device For Air–Fuel Ratio Of Internal Combustion Engine," *Patent Abstracts of Japan*, Oct. 13, 1989, Abstract only.

Y. Sawada, 10–184426, "Air–Fuel Ratio Control Device For Internal Combustion Engine," *Patent Abstracts of Japan*, Jul. 14, 1998, Abstract only.

* cited by examiner

*Primary Examiner*—Thomas Denion
*Assistant Examiner*—Diem Tran
(74) *Attorney, Agent, or Firm*—Foley & Lardner

(57) ABSTRACT

A controller (6) computes the oxygen storage amount of the catalyst (3) separately as a high-speed component and a low speed component in accordance with actual characteristic. A target air-fuel ratio of an engine (1) is computed so that the oxygen storage amount is a predetermined target amount, and air-fuel ratio control of the engine (1) is performed. The oxygen storage amount is computed using an storage/release rate set according to the exhaust air-fuel ratio and catalyst temperature, etc. In this way, the oxygen storage amount of the catalyst can be precisely computed regardless of the variation in the storage/release rate which accompanies a catalyst temperature variation, and the real oxygen storage amount can therefore be controlled with a higher level of precision.

10 Claims, 17 Drawing Sheets

ENGINE EXHAUST PURIFICATION DEVICE

FIELD OF THE INVENTION

The present invention relates to an engine exhaust purification device provided with a catalyst.

BACKGROUND OF THE INVENTION

JP-A-H9-228873 published by the Japanese Patent Office in 1997 discloses a technique wherein an oxygen amount stored in a three-way catalyst (hereafter, "oxygen storage amount") is estimated based on an engine intake air amount and an air fuel ratio of an exhaust flowing into the catalyst, and engine air-fuel ratio control is performed so that the oxygen storage amount of the catalyst is constant.

To maintain the NOx (nitrogen oxides), CO and HC (hydrocarbon) conversion efficiency of the three-way catalyst at a maximum, the catalyst atmosphere must be maintained at the stoichiometric air-fuel ratio. If the oxygen storage amount of the catalyst is maintained constant, oxygen in the exhaust is stored in the catalyst even if the air-fuel ratio of the exhaust flowing into the catalyst temporarily becomes lean, and conversely, oxygen stored in the catalyst is released even if the air-fuel ratio of the exhaust flowing into the catalyst temporarily becomes rich, so the catalyst atmosphere can be maintained at the stoichiometric air-fuel ratio.

Therefore, in an exhaust purification device performing this type of control, it is required to calculate the oxygen storage amount precisely to maintain the conversion efficiency of the catalyst at a high level, and various methods of computing the oxygen storage amount have been proposed.

SUMMARY OF THE INVENTION

However, in the prior art, as the oxygen storage amount was computed without considering the variation of catalyst characteristic in the engine running state, errors occurred in the computational result for the oxygen storage amount due for example to variation of catalyst temperature. As a result, there was a risk that the accuracy of air-fuel ratio control would increase and exhaust emissions would worsen. Further, when the catalyst deteriorates, due to the maximum oxygen storage amount decreases, so there was a risk that the target amount would relatively shift from the appropriate value, conversion efficiency of the catalyst would be down, therefore exhaust performance with time would decrease.

It is therefore an object of this invention to resolve the above problem, and provide an engine exhaust purification device wherein the high conversion efficiency of a catalyst is maintained.

In order to achieve above object, this invention provides an engine purification device comprises a catalyst provided in an engine exhaust passage, a sensor which detects an exhaust characteristic flowing into the catalyst, and a microprocessor programmed to set a oxygen storage/release rate of the catalyst according to an engine running state, to compute an oxygen storage amount of the catalyst using the detected exhaust characteristic and the oxygen storage/release rate, to compute a target air-fuel ratio of the engine so that the oxygen storage amount of the catalyst is a predetermined target value based on the computed oxygen storage amount.

DESCRIPTION OF THE PREFERRED EMBODIMENTS

Figure 1:
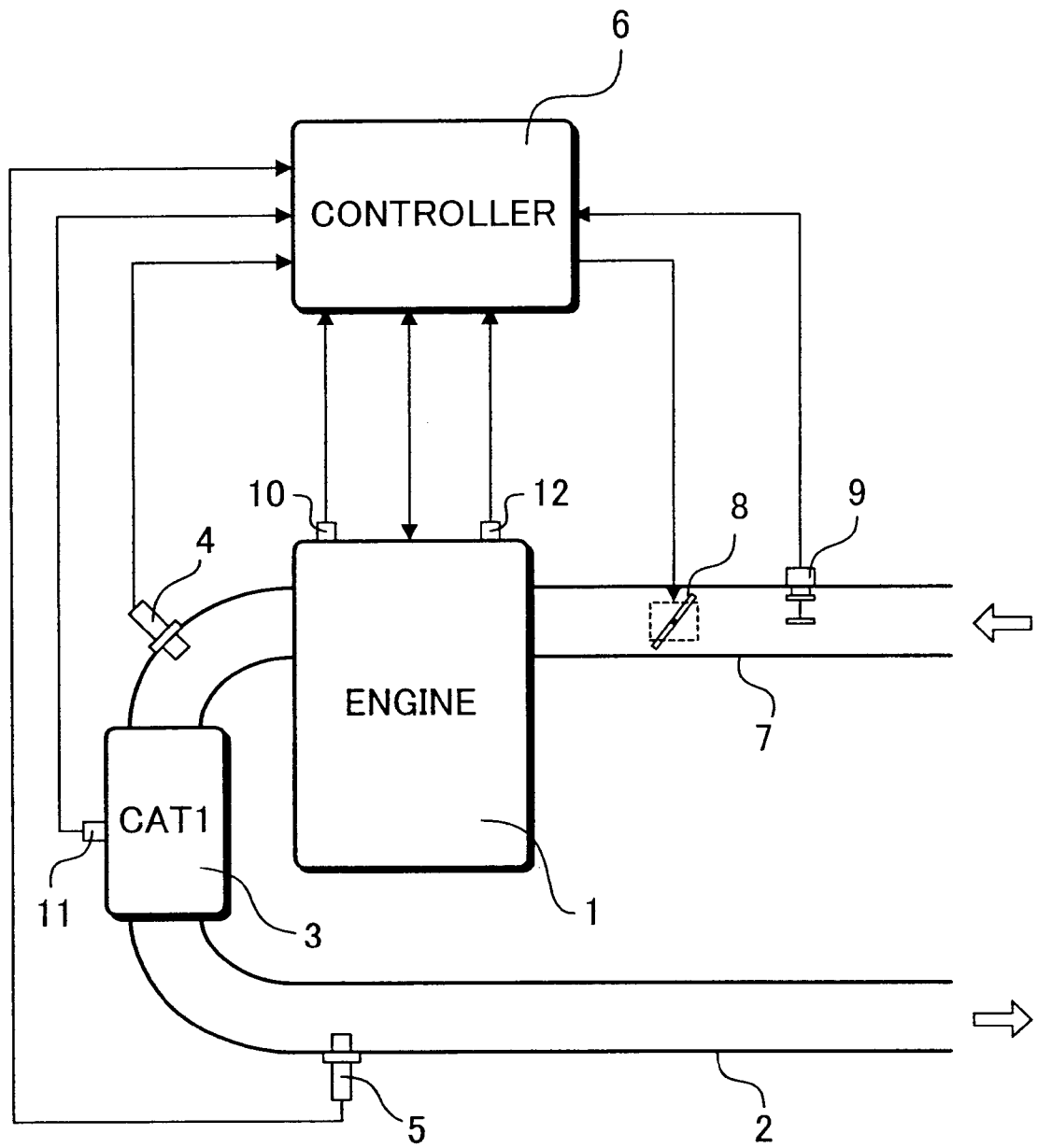
FIG. 1 is a schematic diagram of an exhaust purification device according to this invention.

Referring to FIG. 1 of the drawings, an exhaust passage 2 of an engine 1 is provided with a catalyst 3, front wide range air-fuel ratio sensor 4 (hereafter referred to as front A/F sensor), a rear oxygen sensor 5 and controller 6.

A throttle 8, and an air flow meter 9 which detects the intake air amount adjusted by the throttle 8, are provided in an intake passage 7 of the engine 1. In addition, a crank angle sensor 12 which detects the engine rotation speed of the engine 1 is provided.

The catalyst 3 is a catalyst having a three-way catalyst function. The catalyst 3 purifies NOx, HC and CO with maximum efficiency when the catalyst atmosphere is at the stoichiometric air-fuel ratio. The catalyst carrier of the catalyst 3 is coated with an oxygen storage material such as cerium oxide, and the catalyst 3 has the function of storing or releasing oxygen according to the air-fuel ratio of the inflowing exhaust (referred to hereafter as oxygen storage function).

Here, the oxygen storage amount of the catalyst 3 may be partitioned into a high speed component HO2 which is stored and released by a noble metal in the catalyst 3 (Pt, Rh, Pd), and a low speed component LO2 which is stored and released by the oxygen storage material in the catalyst 3. The low speed component LO2 represents the storage and release of a larger amount of oxygen than the high speed component HO2, but its storage/release rate is slower than that of the high speed component HO2.

Further, this high speed component HO2 and low speed component LO2 have characteristics as follows:

When oxygen is stored, oxygen is stored preferentially as the high speed component HO2, and begins to be stored as the low speed component LO2 when the high speed component HO2 has reached a maximum capacity HO2MAX and can no longer be stored.

When oxygen is released, and the ratio of the low speed component LO2 to the high speed component HO2 (LO2/HO2) is less than a predetermined value, i.e. when the high speed component is relatively large, oxygen is preferentially released from the high speed component HO2, and when the ratio of the low speed component LO2 to the high speed component HO2 is larger than the predetermined value, oxygen is released from both the high speed component HO2 and low speed component LO2 so that the ratio of the low speed component LO2 to the high speed component HO2 does not vary.

Figure 2:
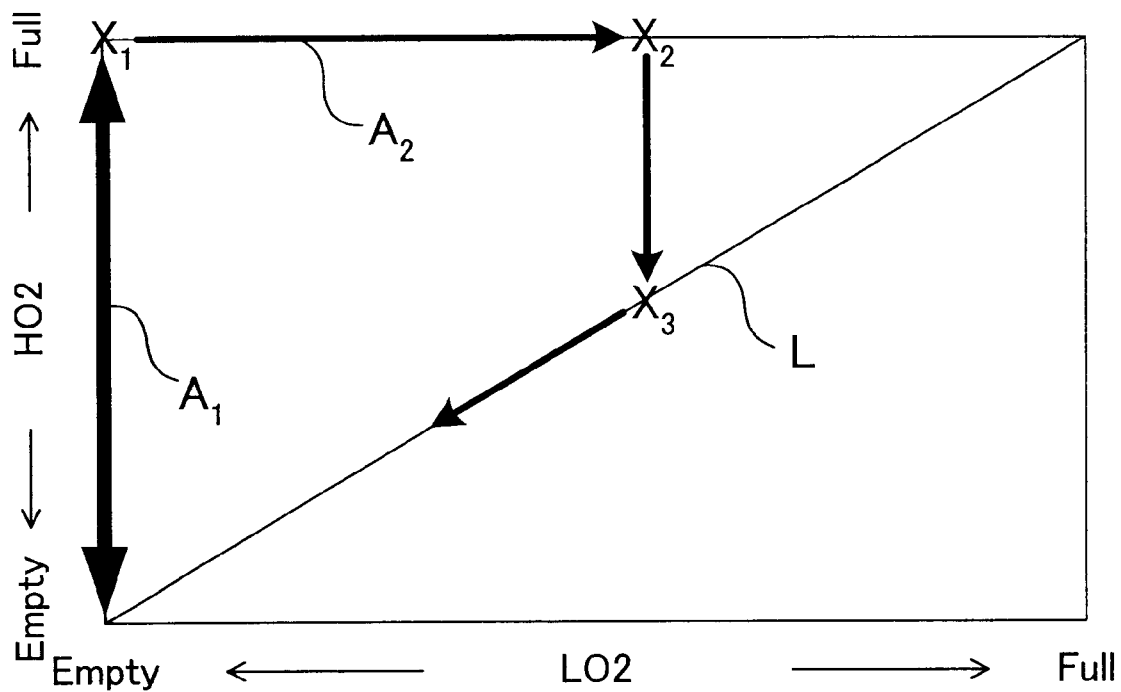
FIG. 2 is a diagram showing the oxygen release characteristics of a catalyst.

FIG. 2 shows the experimental results for these characteristics. The vertical axis shows released amount from the high speed component HO2, and the horizontal axis shows released amount from the low speed component LO2. If three different amounts are experimentally released from effectively the same release start points ($X_1$, $X_2$, $X_3$), the release finish points are $X_1'$, $X_2'$, $X_3'$ and the ratio of low speed component to high speed component is constant when release is complete.

As a result, it appears that when oxygen release begins, the oxygen is released from the high speed component so that the high speed component decreases, and when the ratio of low speed component to high speed component reaches a predetermined ratio, this ratio is subsequently maintained, i.e., oxygen is released while moving on a straight line L shown in the Figure. Here, the low speed component is from 5 to 15, and preferably approximately 10, relative to the high speed component 1. The same characteristics are obtained even when the release start point lies in the region below the line L.

When the release start point is in the region to the left of the line L (Y in the Figure), oxygen is released effectively along the straight line connecting the start point and finish point Y'.

Returning to FIG. 1, the front A/F sensor 4 provided upstream of the catalyst 3 outputs a voltage according to the air-fuel ratio of the exhaust flowing into the catalyst 3. The rear oxygen sensor 5 provided downstream of the catalyst 3 detects whether the exhaust air-fuel ratio downstream of the catalyst 3 is rich or lean with the stoichiometric air-fuel ratio as a threshold value. Here, an economical oxygen sensor was provided downstream of the catalyst 3, but an A/F sensor which can detect the air fuel ratio continuously can be provided instead.

The cooling water temperature sensor 10 which detects the temperature of the cooling water is fitted to the engine 1. The detected cooling water temperature is used for determining the running state of the engine 1, and also for estimating the catalyst temperature of the catalyst 3.

The controller 6 comprises a microprocessor, RAM, ROM and I/O interface, and it computes the oxygen storage amount of the catalyst 3 (high speed component HO2 and low speed component LO2) based on the output of the air flow meter 9, front A/F sensor 4 and cooling water temperature sensor 10.

When the high speed component HO2 of the computed oxygen storage amount is greater than a predetermined amount (e.g., half the maximum capacity HO2MAX of the high speed component), the controller 6 makes the air fuel ratio of the engine 1 rich, makes the air-fuel ratio of the exhaust flowing into the catalyst 3 rich, and decreases the high speed component HO2. Conversely, when it is less than the predetermined amount, the controller 6 makes the air fuel ratio of the engine 1 lean, makes the air-fuel ratio of the exhaust flowing into the catalyst 3 lean, increases the high speed component HO2, and maintains the high speed component HO2 of the oxygen storage amount constant.

A discrepancy may arise between the computed oxygen storage amount and real oxygen storage amount due to computational error, so the controller 6 resets the computational value of the oxygen storage amount with a predetermined timing based on the air-fuel ratio of the exhaust downstream of the catalyst 3, and corrects this discrepancy from the real oxygen storage amount.

Specifically, when it is determined that the air-fuel ratio downstream of the catalyst 3 is lean based on the output of the rear oxygen sensor 5, it is determined that at least the high speed component HO2 is maximum, and the high speed component HO2 is reset to maximum capacity. When it is determined by the rear oxygen sensor 5 that the air fuel ratio downstream of the catalyst 3 is rich, oxygen is no longer being released not only from the high speed component HO2 but also from the low speed component LO2, so the high speed component HO2 and high speed component LO2 are reset to minimum capacity.

Next, the control performed by the controller 6 will be described.

First, the computation of the oxygen storage amount will be described, followed by resetting of the computational value of the oxygen storage amount, and air-fuel ratio control of the engine 1 based on the oxygen storage amount.

Figure 3:
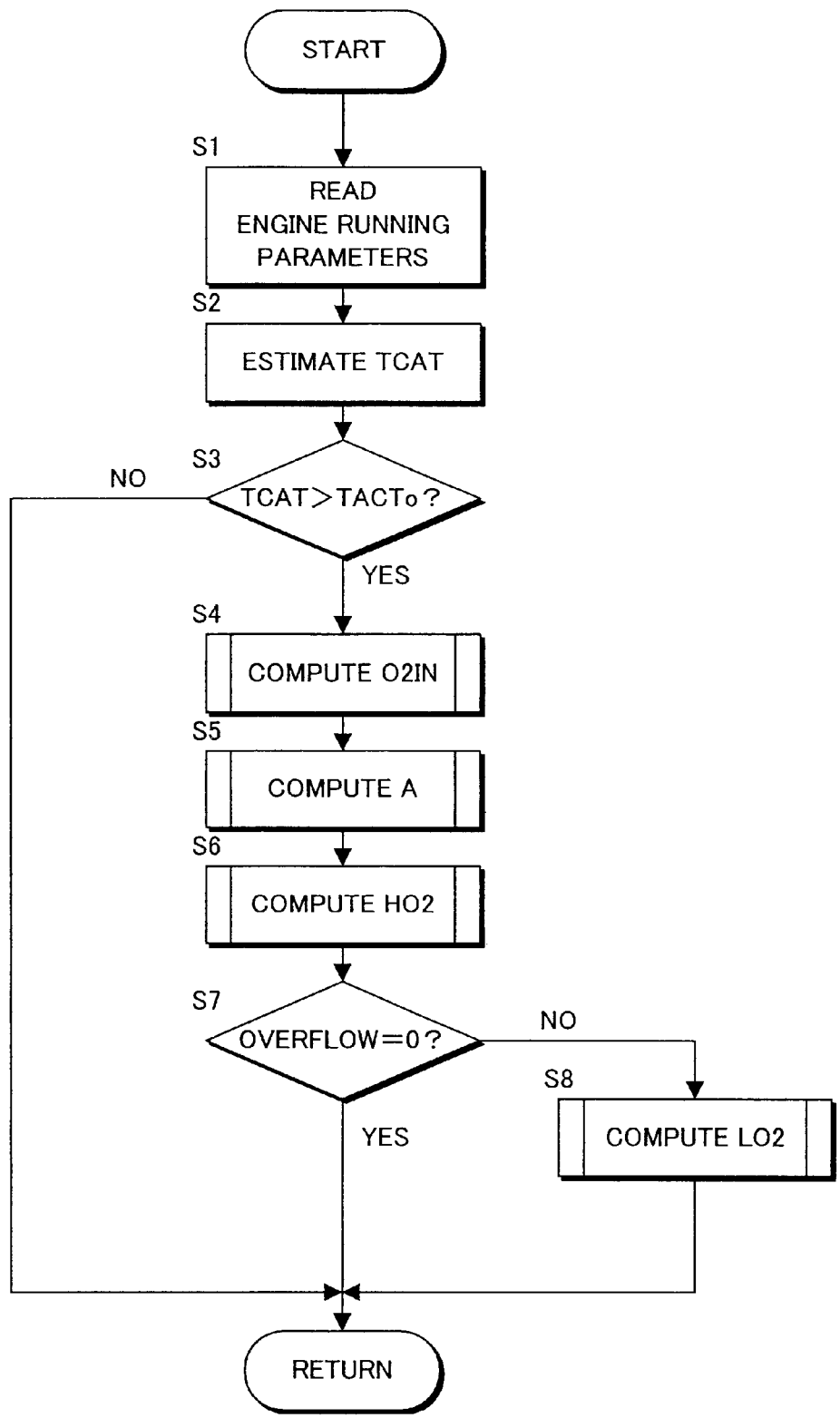
FIG. 3 is a flowchart showing a routine for computing an oxygen storage amount of the catalyst.

According to the routine as shown by FIG. 3, first, in a step S1, the outputs of the cooling water temperature sensor 10, crank angle sensor 12 and air flow meter 9 are read as running parameters of the engine 1. In a step S2, a temperature TCAT of the catalyst 3 is estimated based on these parameters. In a step S3, by comparing the estimated catalyst temperature TCAT and a catalyst activation temperature TACTo (e.g. 300° C.), it is determined whether or not the catalyst 3 has activated.

When it is determined that the catalyst activation temperature TACTo has been reached, the routine proceeds to a step S4 to compute the oxygen storage amount of the catalyst 3. When it is determined that the catalyst activation temperature TACTo has not been reached, processing is terminated assuming that the catalyst 3 does not store or release oxygen.

In a step S4, a subroutine (FIG. 4) for computing an oxygen excess/deficiency amount O2IN is performed, and the oxygen excess/deficiency amount of the exhaust flowing into the catalyst 3 is computed. In a step S5, a subroutine (FIG. 5) for computing an oxygen release rate A of the high speed component of the oxygen storage amount is performed, and the oxygen release rate A of the high speed component is computed.

Further, in a step S6, a subroutine (FIG. 6) for computing the high speed component HO2 of the oxygen storage amount is performed, and the high speed component HO2 and an oxygen amount OVERFLOW overflowing into the low speed component LO2 without being stored as the high speed component HO2, are computed based on the oxygen excess/deficiency amount O2IN and the oxygen release rate A of the high speed component.

In a step S7, it is determined whether or not all of the oxygen excess/deficiency amount O2IN flowing into the catalyst 3 has been stored as the high speed component HO2 based on the overflow oxygen amount OVERFLOW. When all of the oxygen excess/deficiency amount O2IN has been stored as the high speed component (OVERFLOW=0), processing is terminated. In other cases, the routine proceeds to a step S8, a subroutine (FIG. 7) is performed for computing the low speed component LO2, and the low speed component LO2 is computed based on the overflow oxygen amount OVERFLOW overflowing from the high speed component HO2.

Here, the catalyst temperature TCAT is estimated from the cooling water temperature of the engine 1, the engine load and the engine rotation speed, but a temperature sensor 11 may also be attached to the catalyst 3 as shown in FIG. 1 and the temperature of the catalyst 3 measured directly.

When the catalyst temperature TCAT is less than the activation temperature TACTo, the oxygen storage amount is not computed, but the step S3 may be eliminated, and the effect of the catalyst temperature TCAT may be reflected in the oxygen release rate A of the high speed component or an oxygen storage/release rate B of the low speed component, described later.

Next, a subroutine performed from steps S4 to S6 and in the step S8 will be described.

Figure 4:
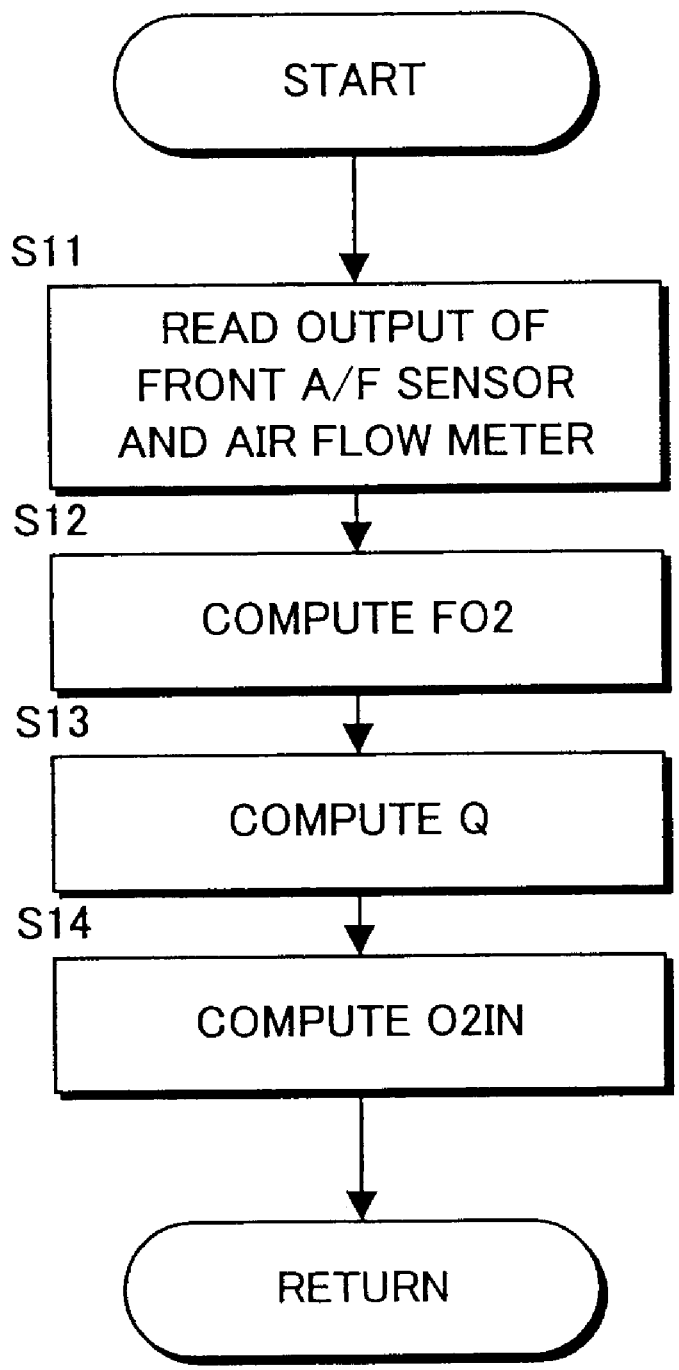
FIG. 4 is a flowchart showing a subroutine for computing an oxygen excess/deficiency amount in exhaust flowing into the catalyst.

FIG. 4 shows the subroutine for computing the oxygen excess/deficiency amount O2IN of the exhaust flowing into the catalyst 3. In this subroutine, the oxygen excess/deficiency amount O2IN of the exhaust flowing into the catalyst 3 is computed based on the air-fuel ratio of the exhaust upstream of the catalyst 3 and the intake air amount of the engine 1.

First, in a step S11, the output of the front A/F sensor 4 and the output of the air flow meter 9 are read.

Next, in a step S12, the output of the front A/F sensor 4 is converted to an excess/deficiency oxygen concentration FO2 of the exhaust flowing into the catalyst 3 using a predetermined conversion table. Here, the excess/deficiency oxygen concentration FO2 is a relative concentration based on the oxygen concentration at the stoichiometric air-fuel ratio. If the exhaust air-fuel ratio is equal to the stoichiometric air-fuel ratio, it is zero, if it is richer than the stoichiometric air-fuel ratio it is negative, and if it is leaner than the stoichiometric air-fuel ratio, it is positive.

In a step S13, the output of the air flow meter 9 is converted to an intake air amount Q using a predetermined conversion table, and in a step S14, the intake air amount Q is multiplied by the excess/deficiency oxygen concentration FO2 to compute the excess/deficiency oxygen amount O2IN of the exhaust flowing into the catalyst 3.

As the excess/deficiency oxygen concentration FO2 has the above characteristics, the excess/deficiency oxygen amount O2IN is zero when the exhaust flowing into the catalyst 3 is at the stoichiometric air-fuel ratio, a negative value when it is rich, and a positive value when it is lean.

Figure 5:
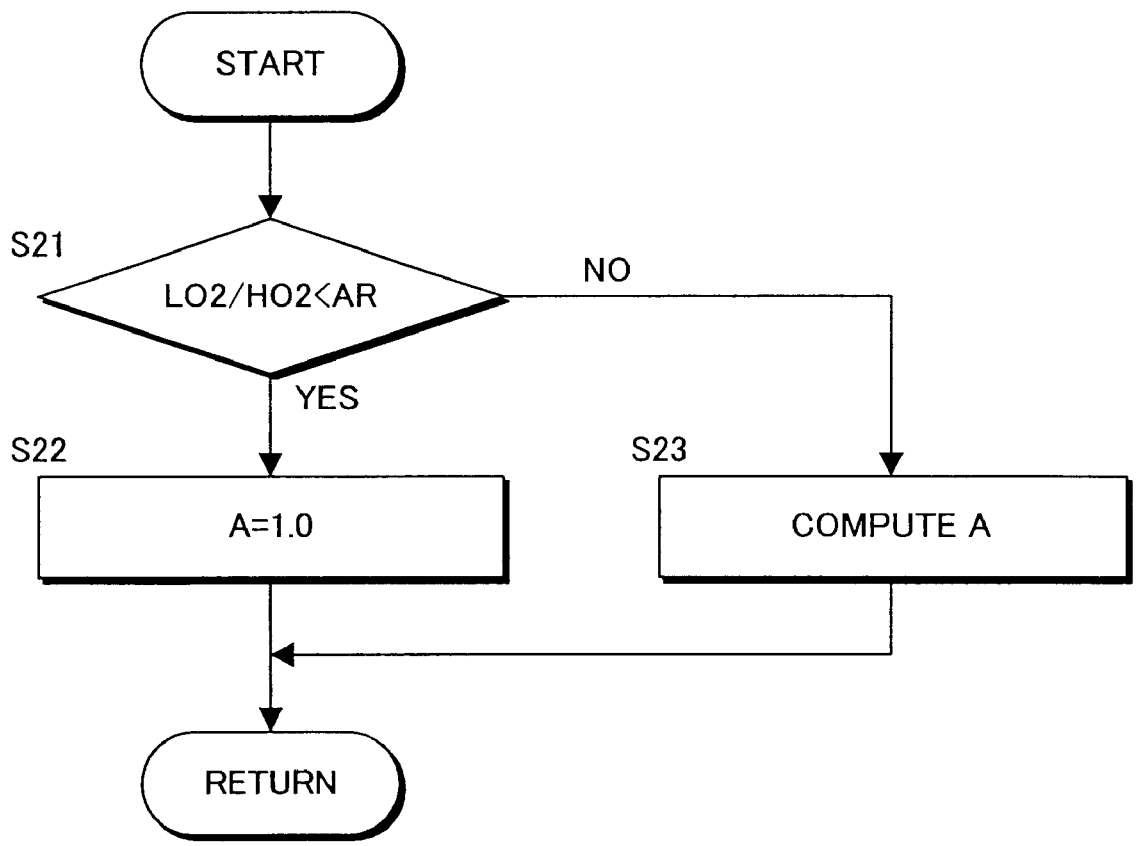
FIG. 5 is a flowchart showing a subroutine for computing an oxygen release rate of a high speed component.

FIG. 5 shows a subroutine for computing the oxygen release rate A of the high speed component of the oxygen storage amount. In this subroutine, as the oxygen release rate of the high speed component HO2 is affected by the low speed component LO2, the oxygen release rate A of the high speed component is computed according to the low speed component LO2.

First, in a step S21, it is determined whether or not a ratio LO2/HO2 of low speed component relative to the high speed component is less than a predetermined value AR (e.g. AR=10). When it is determined that the ratio LO2/HO2 is less than the predetermined value AR, i.e., when the high speed component HO2 is relatively larger than the low speed component LO2, the routine proceeds to a step S22, and the oxygen release rate A of the high speed component is set to 1.0 expressing the fact that oxygen is released first from the high speed component HO2.

On the other hand, when it is determined that the ratio LO2/HO2 is not less than the predetermined value AR, oxygen is released from the high speed component HO2 and the low speed component LO2 so that the ratio of the low speed component LO2 to the high speed component HO2 does not vary. The routine then proceeds to a step S23, and a value of the oxygen release rate A of the high speed component is computed which does not cause the ratio LO2/HO2 to vary.

Figure 6:
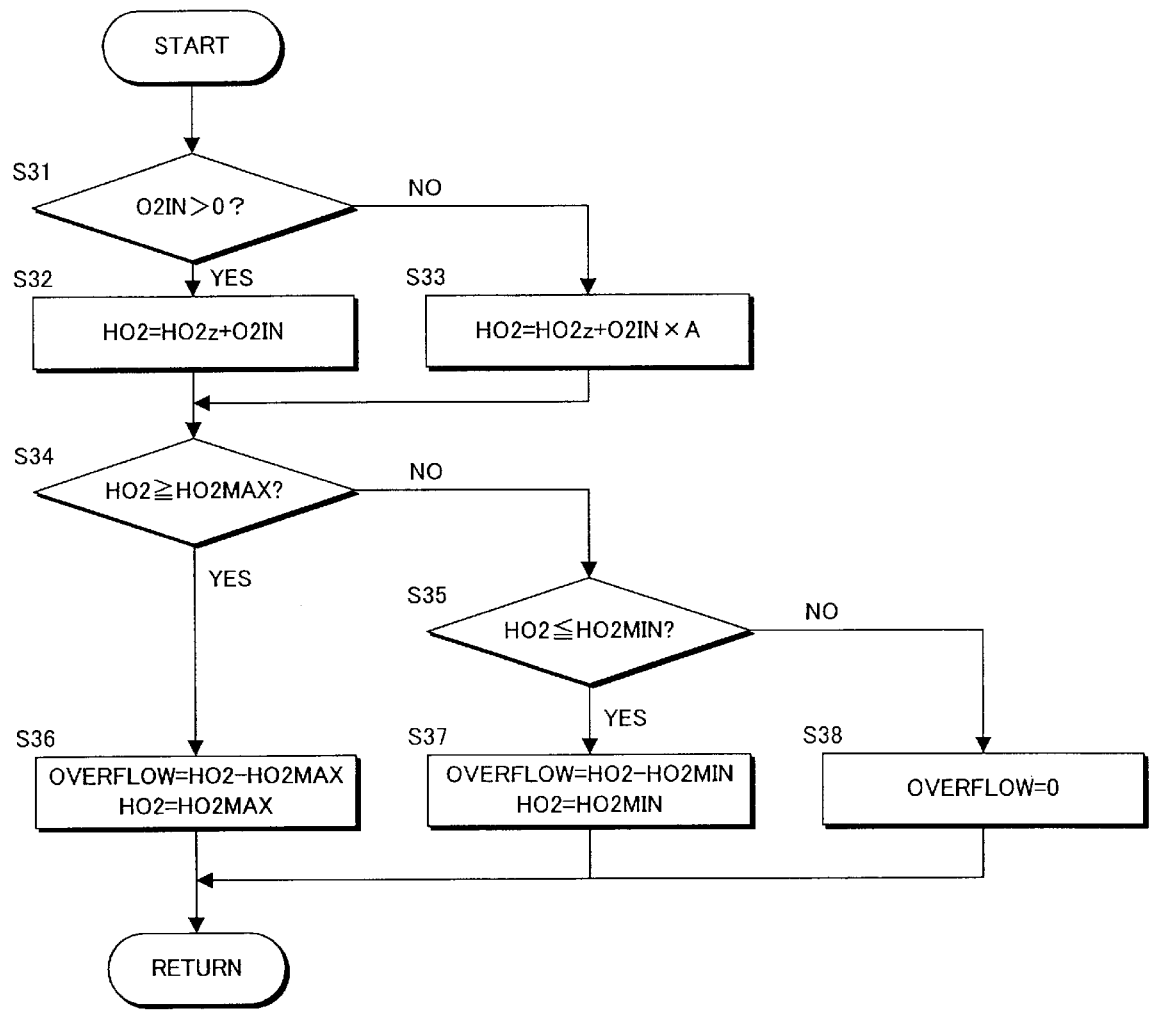
FIG. 6 is a flowchart showing a subroutine for computing the high speed component of the oxygen storage amount.

FIG. 6 shows a subroutine for computing the high speed component HO2 of the oxygen storage amount. In this subroutine, the high speed component HO2 is computed based on the oxygen excess/deficiency amount O2IN of the exhaust flowing into the catalyst 3 and the oxygen release rate A of the high speed component.

First, it is determined in a step S31 whether or not the high speed component HO2 is being stored or released based on the oxygen excess/deficiency amount O2IN.

When the air-fuel ratio of the exhaust flowing into the catalyst 3 is lean and the oxygen excess/deficiency amount O2IN is larger than zero, it is determined that the high speed component HO2 is being stored, the routine proceeds to a step S32, and the high speed component HO2 is computed from the following equation (1):

$$HO2 = HO2z + O2IN \quad (1)$$

where: HO2z=value of high speed component HO2 on immediately preceding occasion.

On the other hand, when it is determined that the oxygen excess/deficiency amount O2IN is less than zero and the high speed component is being released, the routine proceeds to a step S33, and the high speed component HO2 is computed from the following equation (2):

$$HO2 = HO2z + O2IN \times A \quad (2)$$

where: A=oxygen release rate of high speed component HO2.

In steps S34, S35, it is determined whether or not the computed HO2 exceeds the maximum capacity HO2MAX of the high speed component, or whether it is not less than a minimum capacity HO2MIN (=0).

When the high speed component HO2 is greater than the maximum capacity HO2MAX, the routine proceeds to a step S36, the overflow oxygen amount (excess amount) OVERFLOW flowing out without being stored as the high speed component HO2 is computed from the following equation (3):

$$OVERFLOW = HO2 - HO2MAX \quad (3),$$

and the high speed component HO2 is limited to the maximum capacity HO2MAX.

When the high speed component HO2 is less than the minimum capacity HO2MIN, the routine proceeds to a step S37, the overflow oxygen amount (deficiency amount) OVERFLOW which was not stored as the high speed component HO2 is computed by the following equation (4):

$$OVERFLOW = HO2 - HO2MIN \qquad (4),$$

and the high speed component HO2 is limited to the minimum capacity HO2MIN. Here, zero is given as the minimum capacity HO2MIN, so the oxygen amount which is deficient when all the high speed component HO2 has been released is computed as a negative overflow oxygen amount.

When the high speed component HO2 lies between the maximum capacity HO2MAX and minimum capacity HO2MIN, the oxygen excess/deficiency amount O2IN of the exhaust flowing into the catalyst 3 is all stored as the high speed component HO2, and zero is set to the overflow oxygen amount OVERFLOW.

Here, when the high speed component HO2 is greater than the maximum capacity HO2MAX or less than the minimum capacity HO2MIN, the overflow oxygen amount OVERFLOW which has overflowed from the high speed component HO2 is stored as the low speed component LO2.

Figure 7:
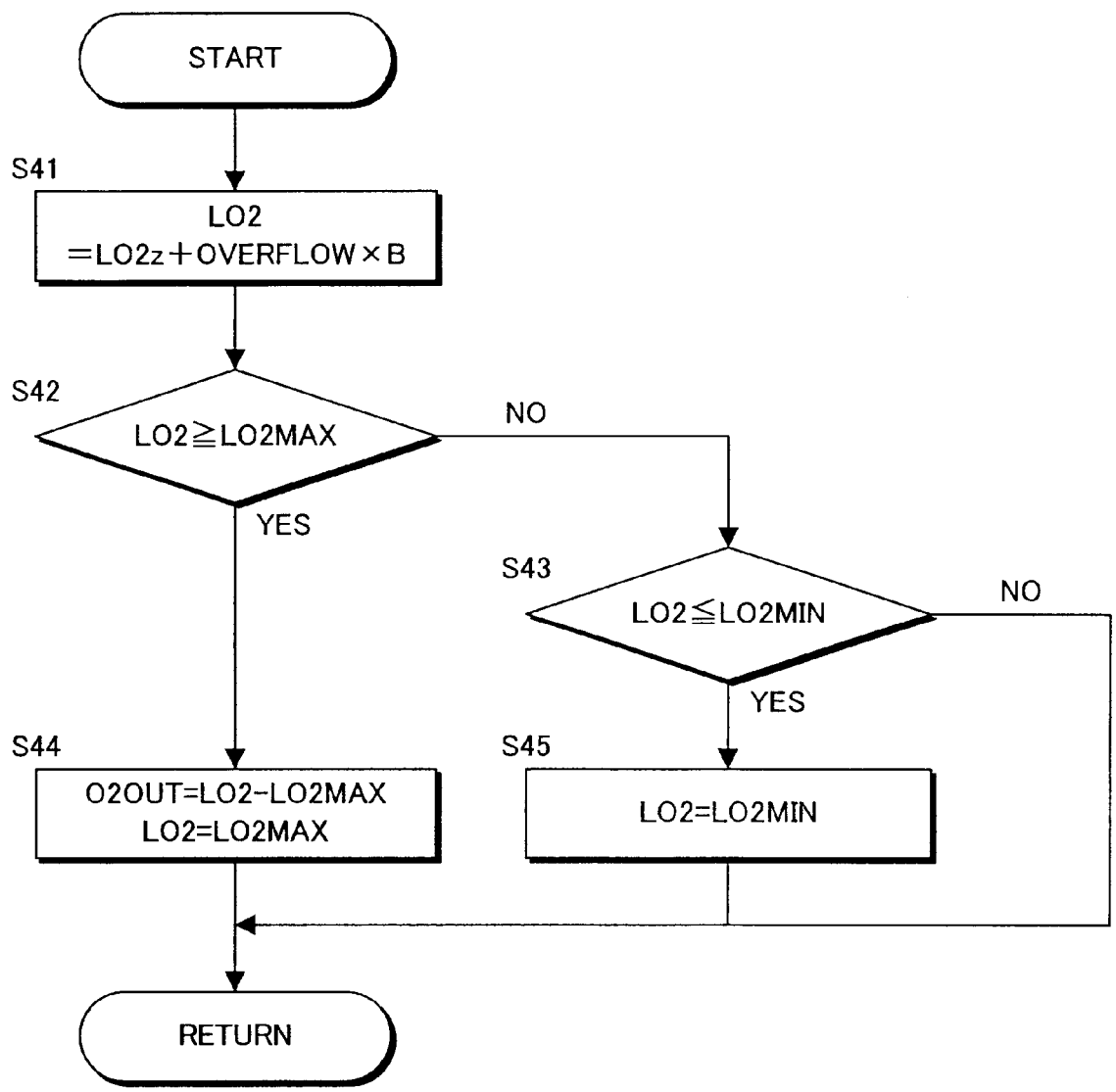
FIG. 7 is a flowchart showing a subroutine for computing a low speed component of the oxygen storage amount.

FIG. 7 shows a subroutine for computing the low speed component LO2 of the oxygen storage amount. In this subroutine, the low speed component LO2 is computed based on the overflow oxygen amount OVERFLOW which has overflowed from the high speed component HO2.

According to this, in a step S41, the low speed component LO2 is computed by the following equation (5):

$$LO2 = LO2z + OVERFLOW \times B \qquad (5)$$

where: LO2z=immediately preceding value of low speed component LO2, and

B=oxygen storage/release rate of low speed component.

Here, the oxygen storage/release rate B of the low speed component is set to a positive value less than 1, but actually has different characteristics for storage and release. Further, the real storage/release rate is affected by the catalyst temperature TCAT and the low speed component LO2, so the storage rate and release rate can be set to vary independently. In this case, when the overflow oxygen amount OVERFLOW is positive, oxygen is in excess, and the oxygen storage rate at this time is set to for example a value which is larger the higher the catalyst temperature TCAT or the smaller the low speed component LO2. Also, when the overflow oxygen amount OVERFLOW is negative, oxygen is deficient, and the oxygen release rate at this time may for example be set to a value which is larger the higher the catalyst temperature TCAT or the larger the low speed component LO2.

In steps S42, S43, in the same way as when the high speed component HO2 is computed, it is determined whether or not the computed low speed component LO2 has exceeded a maximum capacity LO2MAX or is less than a minimum capacity LO2MIN (=0).

When maximum capacity LO2MAX is exceeded, the routine proceeds to a step S44, an oxygen excess/deficiency amount O2OUT which has overflowed from the low speed component LO2 is computed from the following equation (6):

$$LO2OUT = LO2 - LO2MAX \qquad (6)$$

and the low speed component LO2 is limited to the maximum capacity LO2MAX. The oxygen excess/deficiency amount O2OUT flows out downstream of the catalyst 3.

When the low speed component LO2 is less than the minimum capacity, the routine proceeds to a step S45, and the low speed component LO2 is limited to the minimum capacity LO2MIN.

Next, the resetting of the computed value of the oxygen storage amount performed by the controller 6 will be described. By resetting the computed value of the oxygen storage amount under predetermined conditions, computational errors which have accumulated so far are eliminated, and the computational precision of the oxygen storage amount can be improved.

Figure 8:
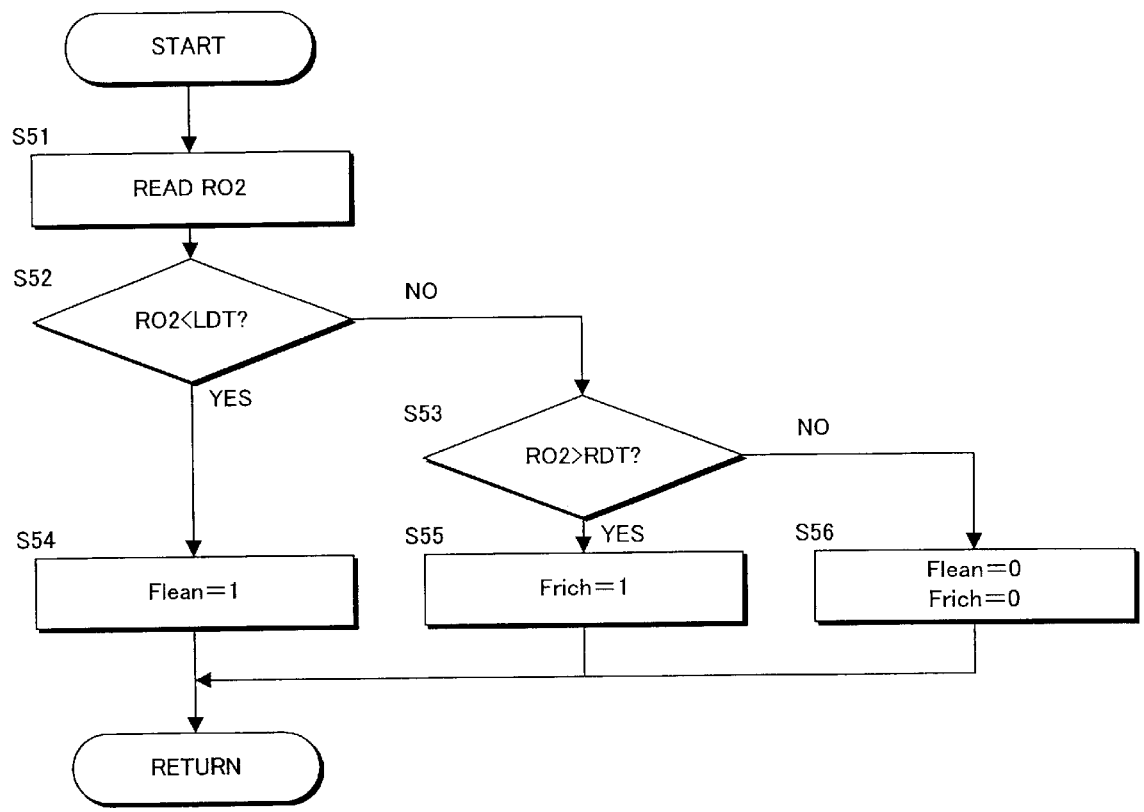
FIG. 8 is a flowchart showing a routine for determining a reset condition.

FIG. 8 shows the details of a routine for determining the reset condition. This routine determines whether or not a condition for resetting the oxygen storage amount (high speed component HO2 and low speed component LO2) holds from the exhaust air-fuel ratio downstream of the catalyst 3, and sets a flag Frich and a flag Flean.

First, in a step S51, the output of the rear oxygen sensor 5 which detects the exhaust air-fuel ratio downstream of the catalyst 3 is read. Subsequently, in a step S52, the rear oxygen sensor output RO2 is compared with a lean determining threshold LDT, and in a step S53, the rear oxygen sensor output RO2 is compared with the rich determining threshold RDT.

As a result of these comparisons, when the rear oxygen sensor output RO2 is less than the lean determining threshold LDT, the routine proceeds to a step S54, and the flag Flean is set to "1" showing that the lean reset condition for the oxygen storage amount holds. When the rear oxygen sensor output RO2 exceeds the rich determining threshold RDT, the routine proceeds to a step S55, and the flag Frich is set to "1" showing that the rich reset condition for the oxygen storage amount holds.

When the rear oxygen sensor output RO2 lies between the lean determining threshold LDT and rich determining threshold RDT, the routine proceeds to a step S56, and the flags Flean and Frich are set to "0" showing that the lean reset condition and rich reset condition do not hold.

Figure 9:
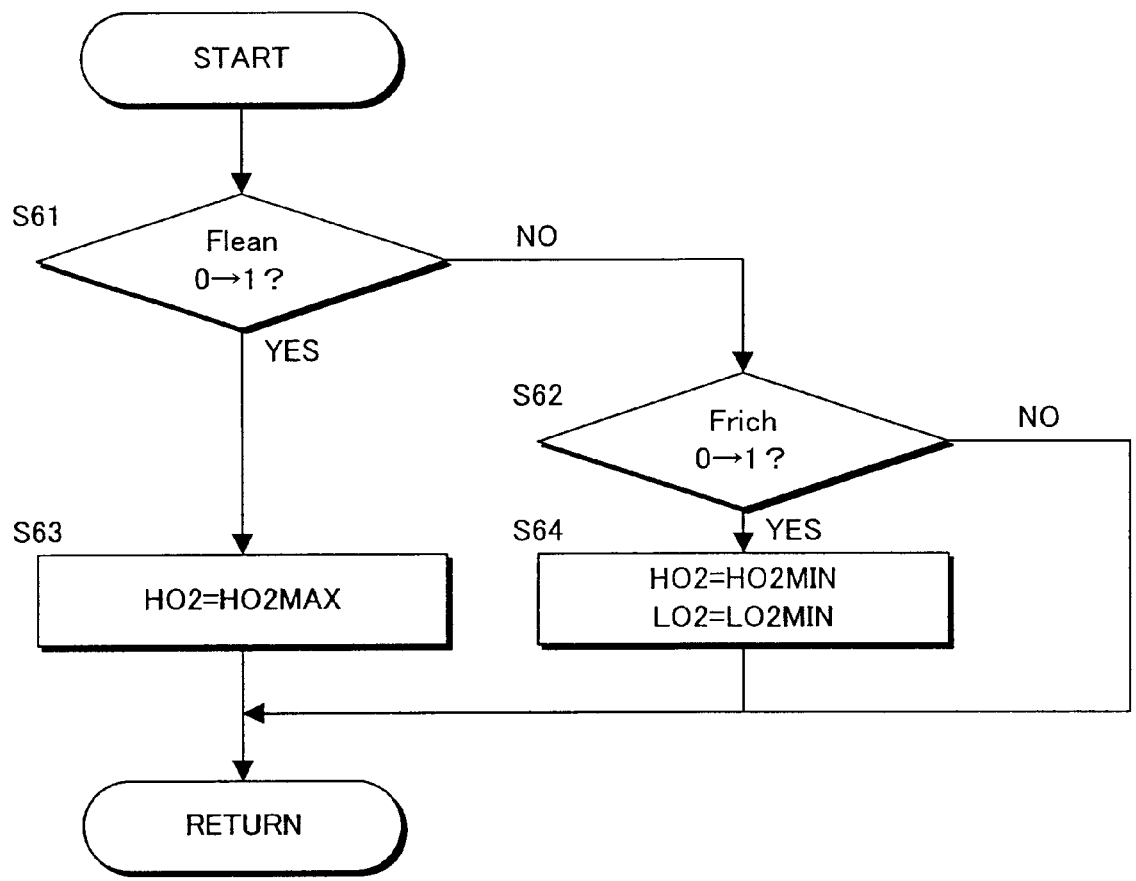
FIG. 9 is a flowchart showing a routine for performing reset of the computed oxygen storage amount.

FIG. 9 shows a routine for resetting the oxygen storage amount.

According to this, in steps S61, S62, it is determined whether or not the lean reset conditions or rich reset conditions hold based on the variation of the values of the flags Flean and Frich.

When the flag Flean changes from "0" to "1", and it is determined that lean reset conditions hold, the routine proceeds to a step S63, and the high speed component HO2 of the oxygen storage amount is reset to the maximum capacity HO2MAX. At this time, resetting of the low speed component LO2 is not performed. On the other hand, when the flag Frich changes from "0" to "1", and it is determined that rich reset conditions hold, the routine proceeds to a step S64, and the high speed component HO2 and low speed component LO2 of the oxygen storage amount are respectively reset to the minimum capacities HO2MIN, LO2MIN.

The reason why resetting is performed under these conditions is that as the oxygen storage rate of the low speed component LO2 is slow, oxygen overflows downstream of the catalyst even if the low speed component LO2 has not reached maximum capacity when the high speed component HO2 reaches maximum capacity, and when the exhaust air-fuel ratio downstream of the catalyst becomes lean, it may be considered that at least the high speed component HO2 has reached maximum capacity.

When the exhaust air fuel ratio downstream of the catalyst becomes rich, oxygen is not released from the low speed component LO2 which is released slowly. Therefore, it may be considered that the high speed component HO2 and low speed component LO2 are both not being stored and are at minimum capacity.

Next, the air-fuel ratio control performed by the controller 6 (oxygen storage amount constant control) will be described.

Figure 10:
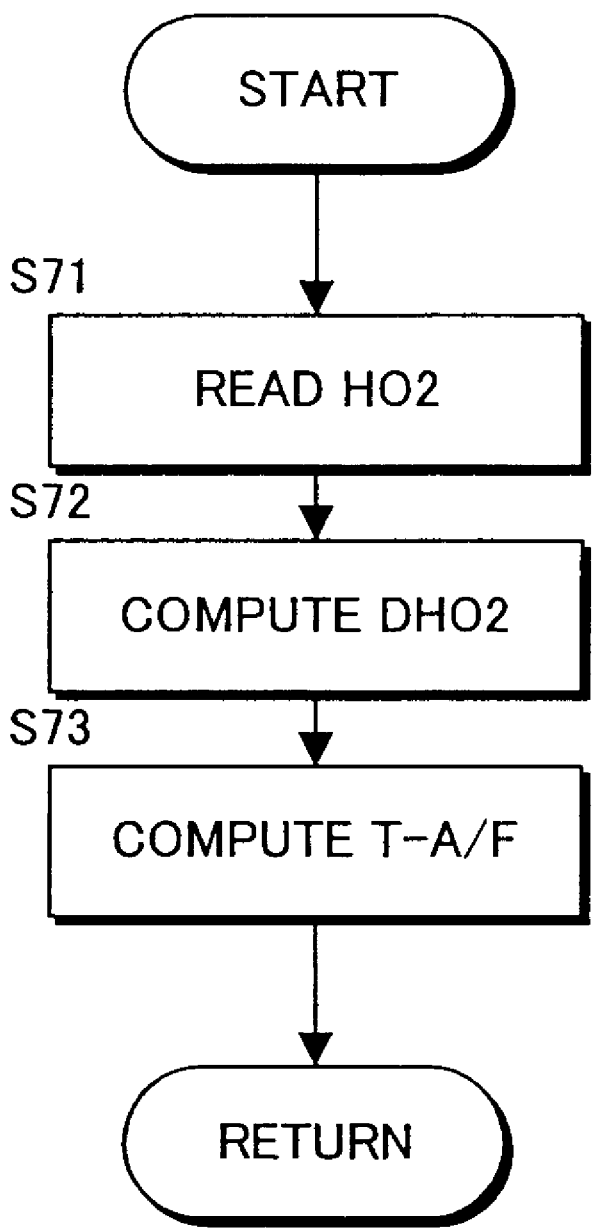
FIG. 10 is a flowchart showing a routine for computing a target air fuel ratio based on the oxygen storage amount.

FIG. 10 shows a routine for computing a target air fuel ratio based on the oxygen storage amount.

According to this, in a step S71, the high speed component HO2 of the present oxygen storage amount is read. In a step S72, a deviation DHO2 (=oxygen excess/deficiency amount required by catalyst 3) between the current high speed component HO2 and a target value TGHO2 of the high speed component, is computed. The target value TGHO2 of the high speed component is set to, for example, half of the maximum capacity HO2MAX of the high speed component.

In a step S73, the computed deviation DHO2 is converted to an air-fuel ratio equivalent value, and a target air-fuel ratio T-A/F of the engine 1 is set.

Therefore, according to this routine, when the high speed component HO2 of the oxygen storage amount does not reach a target amount, the target air fuel ratio of the engine 1 is set to lean, and the oxygen storage amount (high speed component HO2) is increased. On the other hand, when the high speed component HO2 exceeds the target amount, the target air fuel ratio of the engine 1 is set to rich, and the oxygen storage amount (high speed component HO2) is decreased.

Next, the overall action performed by the above control will be described.

In the exhaust purification device according to this invention, when the engine 1 starts, computation of the oxygen storage amount of the catalyst 3 begins, and air fuel ratio control of the engine 1 is performed so that the oxygen storage amount of the catalyst 3 is constant to maintain the conversion efficiency of the catalyst 3 at a maximum.

The oxygen storage amount of the catalyst 3 is estimated based on the air-fuel ratio of the exhaust gas flowing into the catalyst 3 and the intake air amount, and computation of the oxygen storage amount is divided into the high speed component HO2 and low speed component LO2 according to the actual characteristics.

Specifically, the computation is performed assuming that when oxygen is stored, the high speed component HO2 is preferentially stored, and the low speed component LO2 begins to be stored when the high speed component HO2 can no longer be stored. The computation also assumes that when oxygen is released, when the ratio (LO2/HO2) of the low speed component LO2 and high speed component HO2 is less than the predetermined value AR, oxygen is preferentially released from the high speed component HO2, and when the ratio LO2/HO2 reaches the predetermined value AR, oxygen is released from both the low speed component LO2 and high speed component HO2 to maintain this ratio LO2/HO2.

When the high speed component HO2 of the computed oxygen storage amount is larger than the target value, the controller 6 decreases the high speed component by controlling the air-fuel ratio of the engine 1 to rich, and when it is less than the target value, the high speed component HO2 is increased by controlling the air-fuel ratio to lean.

As a result, the high speed component HO2 of the oxygen storage amount is maintained at the target value, and even if the air-fuel ratio of the exhaust flowing into the catalyst 3 shifts from the stoichiometric air-fuel ratio, oxygen is immediately stored as the high speed component HO2 or immediately released as the high speed component HO2 which has a high responsiveness, the catalyst atmosphere is corrected to the stoichiometric air-fuel ratio, and the conversion efficiency of the catalyst 3 is maintained at a maximum.

Further, if computational errors accumulate, the computed oxygen storage amount shifts from the real oxygen storage amount, however the oxygen storage amount (high speed component HO2 and low speed component LO2) is reset with a timing at which the exhaust downstream of the catalyst 3 becomes rich or lean, and any discrepancy between the computed value and real oxygen storage amount is corrected.

Figure 11:
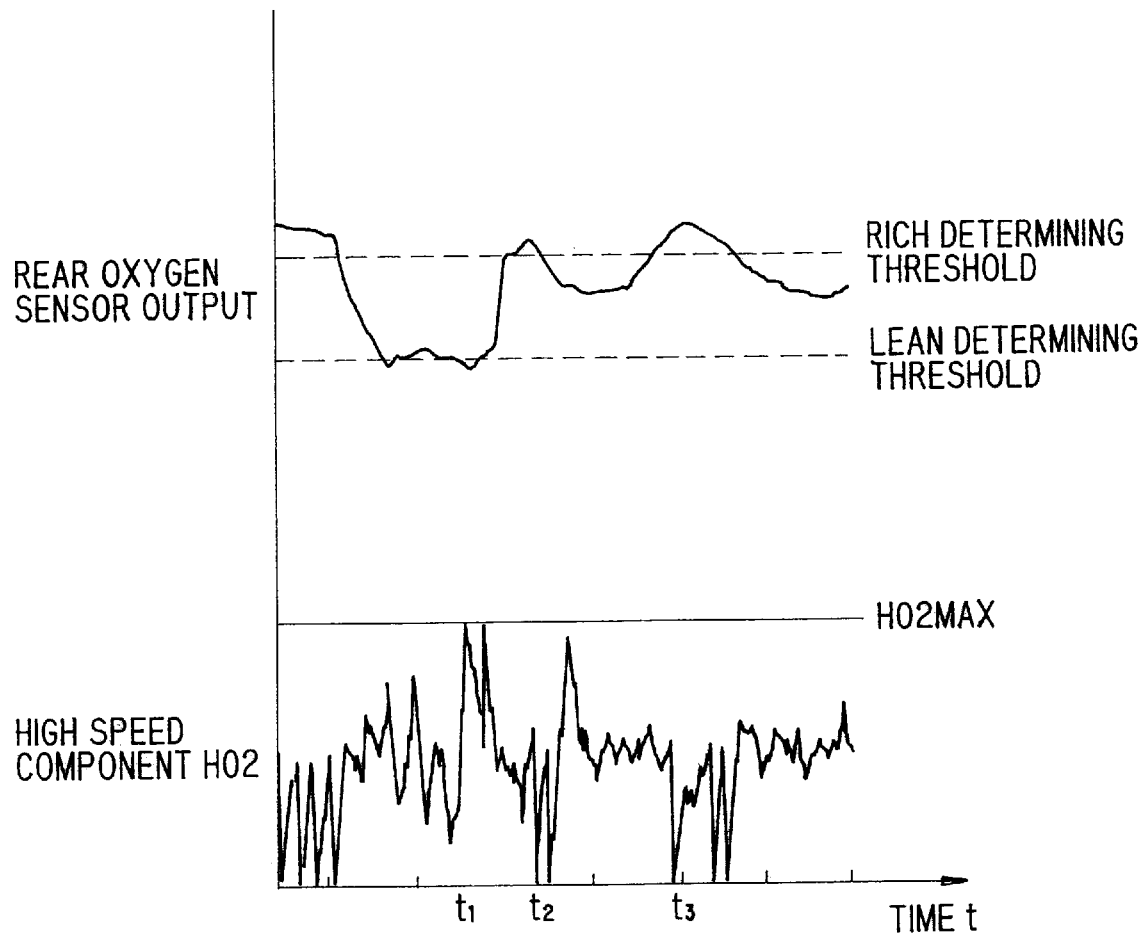
FIG. 11 is a diagram showing how a rear oxygen sensor output and high speed component vary when the oxygen storage amount is controlled to be constant.

FIG. 11 shows how the high speed component HO2 varies when the above oxygen storage amount constant control is performed.

In this case, at the time t1, the output of the rear oxygen sensor 5 becomes less than the lean determining threshold and lean reset conditions hold, so the high speed component HO2 is reset to the maximum capacity HO2MAX. However, the low speed component LO2 is not necessarily a maximum at this time, so reset of the low speed component is not performed, not shown.

At times t2, t3, the output of the rear oxygen sensor 5 becomes greater than the rich determining threshold and rich reset conditions hold, so the high speed component HO2 of the oxygen storage amount is reset to the minimum capacity (=0). The low speed component LO2 at this time is also reset to the minimum capacity, not shown.

Thus, resetting of the computed values of the oxygen storage amount is performed with a timing at which the air-fuel ratio of the exhaust downstream of the catalyst 3 becomes rich or lean, and as a result of the discrepancy from the real oxygen storage amount being corrected, the computational precision of the oxygen storage amount of the catalyst is further enhanced, the precision of air-fuel ratio control for maintaining the oxygen storage amount constant is increased, and the conversion efficiency of the catalyst is maintained at a high level.

The above is an example of the air-fuel ratio control assumed by this invention. Further, according to this invention, exhaust purification performance is further enhanced by appropriately setting the storage/release rate of the catalyst according to the catalyst temperature and learning the maximum oxygen storage amount, and deterioration of the catalyst can be accurately detected. Hereafter, this point will be described referring to FIG. 12 and subsequent figures.

Figure 12:
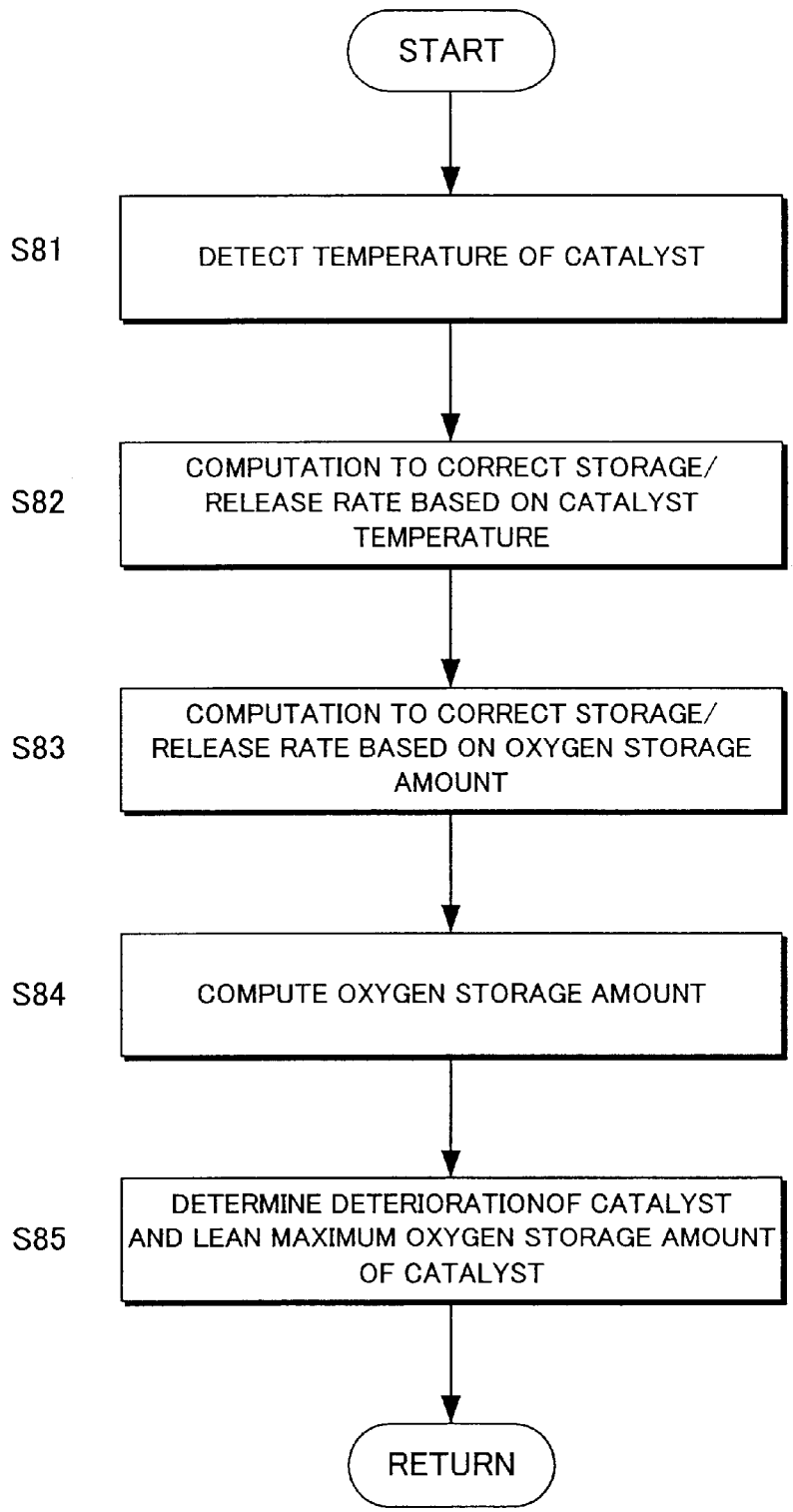
FIG. 12 is a flowchart showing the details of the routine which sets a catalyst storage/release rate according to a running state.
Figure 13:
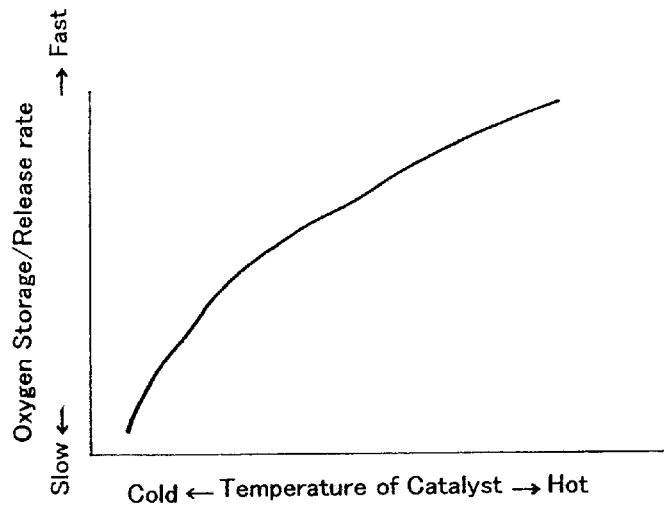
FIG. 13 is a characteristic diagram showing the relation between catalyst temperature and oxygen storage/release rate.

In process as shown in FIG. 12, the temperature of the catalyst 3 is first detected in a step S81. As this catalyst temperature, the catalyst temperature TCAT estimated in the processing of FIG. 3 described above may be used, or it may be directly detected by the temperature sensor 11. Next, processing is performed to correct the storage/release rate used for the computation of the oxygen storage amount based on this catalyst temperature in a step S82. The oxygen storage/release rate has the characteristic of increasing with the rise of catalyst temperature as shown for example in FIG. 13. Hence, a new storage/release rate is set by looking up a table giving the storage/release rate with the characteristic shown in FIG. 13 relative to the catalyst temperature.

Figure 14:
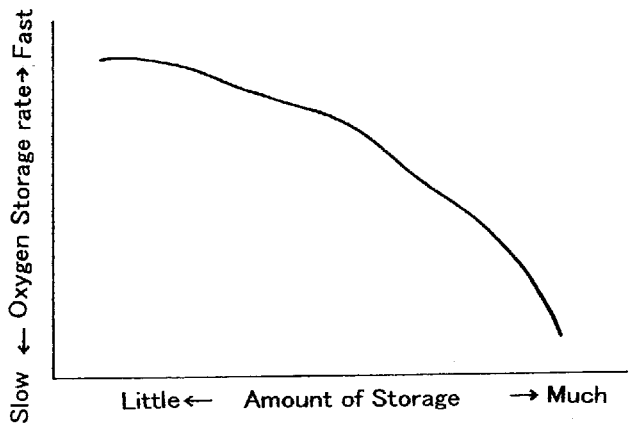
FIG. 14 is a characteristic diagram showing the relation between the oxygen storage amount of the catalyst and the oxygen absorption rate.
Figure 15:
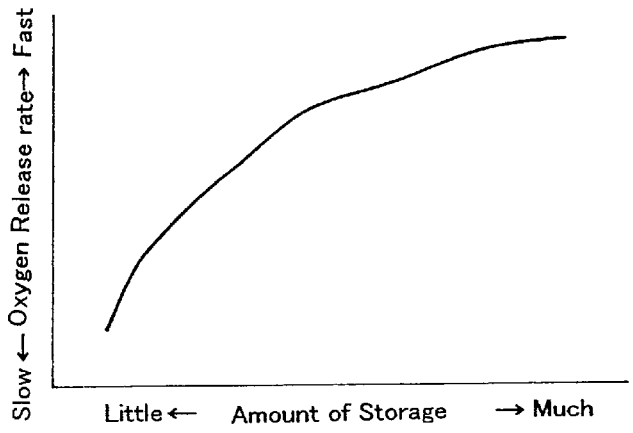
FIG. 15 is a characteristic diagram showing the relation between the oxygen storage amount of the catalyst and the oxygen discharge rate.

Next, the storage/release rate is further corrected according to the present oxygen storage amount (computed value) in a step S83. The storage rate decreases with increase of oxygen storage amount as shown by the examples of FIG. 14, and the release rate increases with increase of oxygen storage amount as shown in FIG. 15. Hence, a final storage/release rate is determined by looking up a table set to give the absorption or discharge rate having a characteristic shown in FIG. 14 and FIG. 15 according to the oxygen storage amount.

Figure 16:
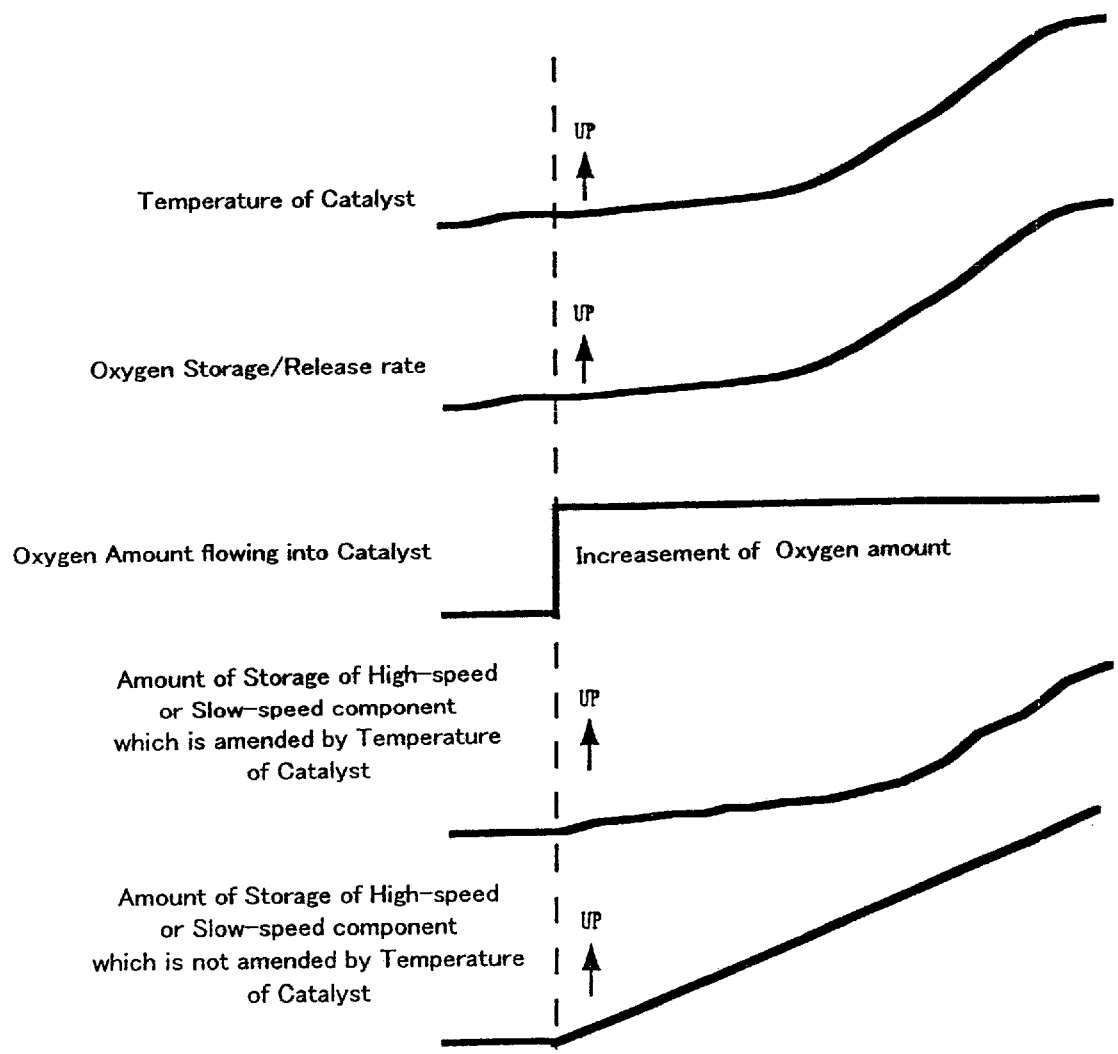
FIG. 16 is a diagram when the computational result of an oxygen storage amount which considers an storage/release rate variation according to catalyst temperature, is compared with the case where the storage/release rate is considered to be constant.
Figure 17:
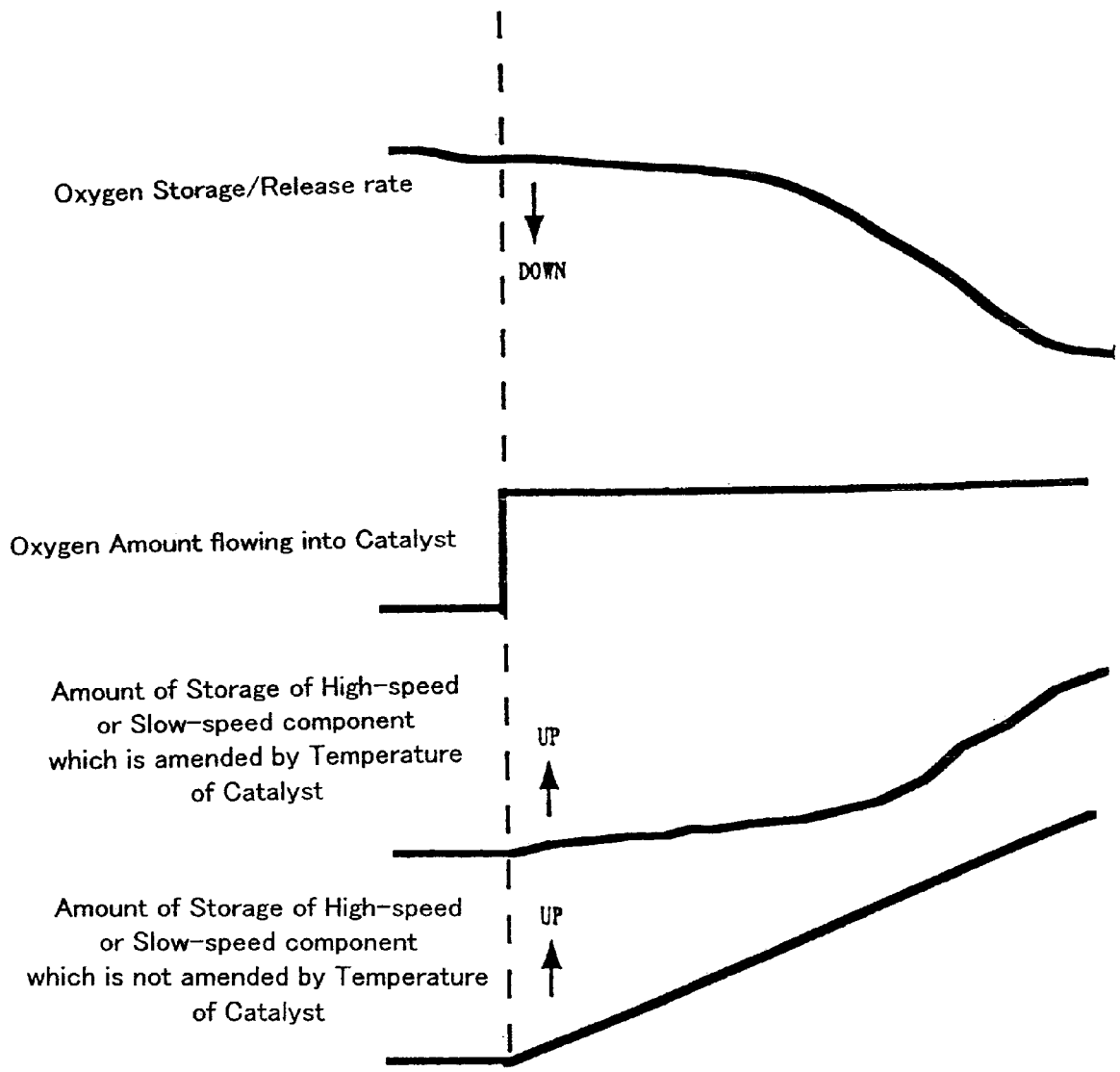
FIG. 17 is a diagram when the computational result of an oxygen storage amount which considers an storage/release rate variation according to oxygen storage amount, is compared with the case where the storage/release rate is considered to be constant.

In this way, the oxygen storage amount is computed based on the final storage/release rate as above in a step S84. This is the computational processing shown in FIG. 3 and FIG. 5. FIG. 16 is a diagram comparing the computation result of the oxygen storage amount considering the storage/release rate variation according to the catalyst temperature, and the case, where the computation is performed assuming the storage/release rate to be constant. FIG. 17 is a similar diagram comparing the computation result of the oxygen storage amount considering the storage/release rate variation according to the oxygen storage amount, and the case where the computation is performed assuming the storage/release rate to be constant. By performing this computation corresponding to the variation of the storage/release rate, the oxygen storage amount can be estimated with higher accuracy.

Figure 18:
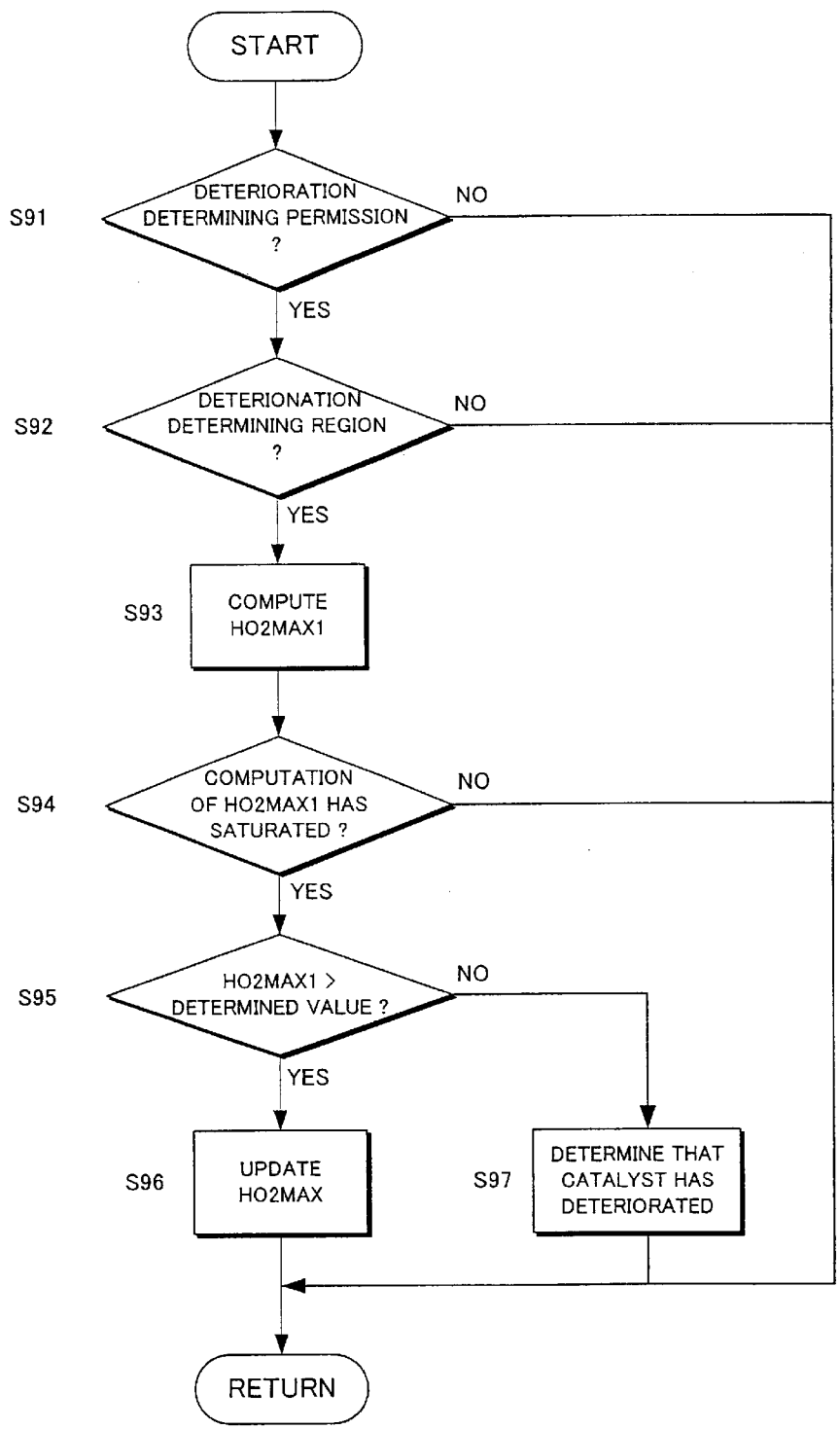
FIG. 18 is a flowchart showing the details of the routine which determines catalyst deterioration.
Figure 19:
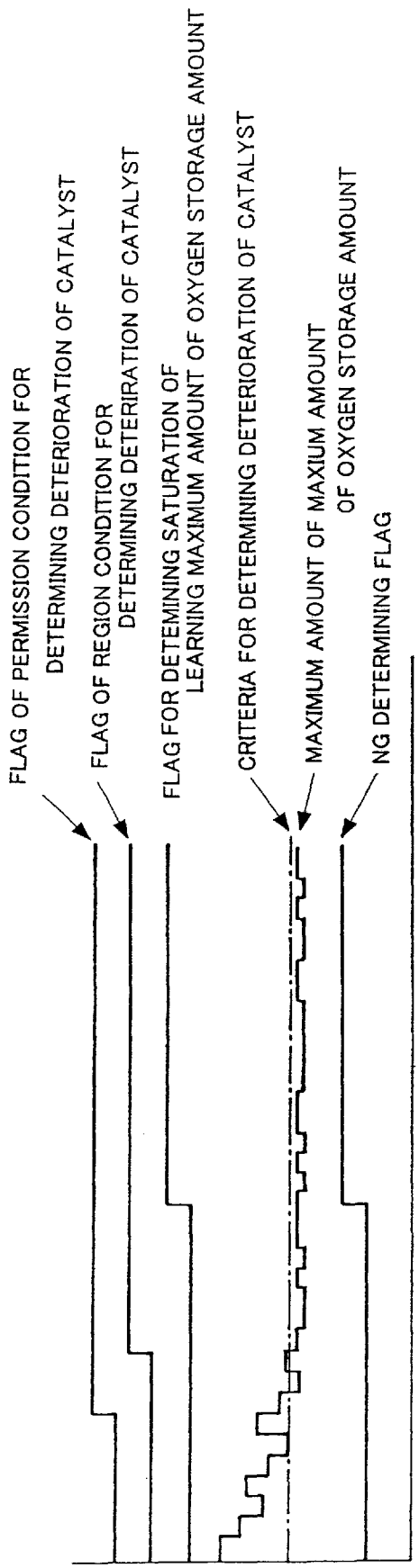
FIG. 19 is a diagram showing the processing result due to the above deterioration determining routine.

Next, a subroutine is performed to determine the deterioration of the catalyst 3 and learn the maximum oxygen storage amount of the catalyst 3 in a step S85. The details of this subroutine are shown in FIG. 18, and a diagram when this processing is performed is shown in FIG. 19.

In this processing, a permission condition of a deterioration determining is first determined in a step S91. This is processing which determines for example whether or not the catalyst 3 is in an active state based on the water temperature or the catalyst temperature. When the catalyst is in an active state, the deterioration determination is permitted, and there is a shift to determination of the next deterioration determining region condition in a step S92. The deterioration determining region condition may for example be the engine rotation speed, fuel injection amount, vehicle speed and air-fuel ratio control state, and it is determined whether or not the running state determined from these lies within a predetermined condition. Due to this, running conditions which are unsuitable for the deterioration determination such as fuel cut during deceleration are excluded, and an appropriate deterioration determination can be performed. When the deterioration determination permission condition and the deterioration determination region condition are both satisfied, the routine starts the deterioration determination of the next step S93 and subsequent steps, and learning processing. When neither of these conditions are satisfied, the present processing is terminated.

In the determination of catalyst deterioration, the maximum oxygen storage amount HO2MAX1 is first computed. The computation technique may be any desired technique. For example, when the catalyst 3 is placed in a rich atmosphere, the oxygen storage amount is 0 and the target air-fuel ratio is made lean, the oxygen amount flowing into the catalyst 3 until the exhaust air-fuel ratio of the catalyst 3 inverts from rich to lean is integrated using a signal from the front A/F sensor 4 and rear O2 sensor 5 so as to compute a real maximum oxygen storage amount. This processing may also be performed using reset processing of the oxygen storage amount shown in FIG. 8 and FIG. 9.

Next, after waiting before the computation result of this maximum oxygen storage amount to saturate, the maximum oxygen storage amount HO2MAX1 computed as described above is compared with its determining reference value in the steps S94, S95. In this comparison, when the maximum oxygen storage amount HO2MAX1 is larger than the determining reference value, it is assumed that there is little deterioration, and the value of HO2MAX1 at that time is updated to the maximum value HO2MAX up to then in a step S96. Hence, by updating the maximum oxygen storage amount HO2MAX in this way, the control target amount of the oxygen storage amount based thereupon is always set appropriately, and a good exhaust purification performance is obtained.

On the other hand, in the determination of the step S95, when it is determined that the maximum oxygen storage amount HO2MAX1 is less than the determining reference value, it is assumed that the catalyst 3 has deteriorated and the result of the deterioration determination is stored in a step S97. This deterioration determination result is stored for example in a self-diagnostic device of the vehicle. Alternatively, the driver may be warned in real time by a monitor lamp or the like.

According to the above inventions, the oxygen storage amount of the catalyst 3 is computed based on the characteristic of the exhaust flowing into the catalyst 3 (e.g., exhaust air-fuel ratio or oxygen concentration) and the storage/release rate, and the real oxygen storage amount is computed separately in terms of a characteristic whereby oxygen is stored/released at high speed by a noble metal in the catalyst 3, and absorbed/discharge at low speed by an oxygen storage material in the catalyst 3 such as ceria. The target air-fuel ratio of the engine is then computed based on this computation result so that, for example, the high-speed component of the oxygen storage amount is a target value (e.g., half of the maximum capacity of the high-speed component), and engine air-fuel ratio control is performed.

On the other hand, in computing the above oxygen storage amount, the storage/release rate which is affected by the catalyst 3 temperature or oxygen storage amount is considered, therefore the oxygen storage amount can be precisely estimated regardless of the fluctuation in the storage/release rate, the accuracy of controlling the oxygen storage amount by air-fuel ratio control is enhanced, and the exhaust purification performance can be further improved.

In addition, the maximum value of the oxygen storage amount is learned, so the oxygen storage amount can be appropriately set to a target amount based on a precise maximum oxygen storage amount which is continually updated. The exhaust air-fuel ratio may be known by monitoring a predetermined variation of the exhaust air-fuel ratio, for example the oxygen amount flowing into the catalyst 3 from a predetermined rich determining value to a lean determining value, and the oxygen amount flowing out of the catalyst 3 from a predetermined rich determining value to a lean determining value. By learning the maximum value of the high-speed component which is sensitive to variation of the exhaust air-fuel ratio, the deterioration of the catalyst 3 can be determined with high precision even when the amplitude of air-fuel ratio control is small, and as there is no need to process detection parameters to determine the deterioration apart from the maximum oxygen storage amount used for this exhaust purification device, the program which determines the deterioration can be simplified.

The embodiments of this invention in which an exclusive property or privilege is claimed are defined.

The contents of Japanese Application No.2000-47943, with a filing date Feb. 24, 2000 is hereby incorporated by reference.

The embodiments of this invention in which an exclusive property or privilege is claimed are defined.

Industrial Applicability

As described above, the exhaust purification device according to the present invention is useful as an exhaust purification device which solve the decrease of the conversion efficiency of the catalyst by the deterioration of the catalyst.

What is claimed is:

1. An engine exhaust purification device, comprising:
   a catalyst provided in an engine exhaust passage,
   a sensor which detects an exhaust characteristic flowing into the catalyst, and
   a microprocessor programmed to:
   set an oxygen storage/release rate of the catalyst according to a temperature of the catalyst,
   compute an oxygen storage amount of the catalyst using the detected exhaust characteristic and the oxygen storage/release rate, and
   compute a target air-fuel ratio of the engine based on the computed oxygen storage amount so that the oxygen storage amount of the catalyst is a predetermined target value,
   wherein the microprocessor is further programmed to compute the oxygen storage amount of the catalyst separately for a high-speed component which has a high oxygen storage/release rate, and a low speed component which has a slower oxygen storage/release rate than the high-speed component.

2. The engine exhaust purification device as defined in claim 1, wherein the microprocessor is further programmed to detect the temperature of the catalyst based on engine running parameters.

3. The engine exhaust purification device as defined in claim 1, wherein the microprocessor is further programmed to set the oxygen storage/release rate according to the oxygen storage amount of the catalyst in addition to the temperature.

4. The engine exhaust purification device as defined in claim 1, wherein the microprocessor is further programmed to learn a maximum oxygen storage amount of at least the high-speed component, and to determine which the catalyst is deteriorated when the learned maximum oxygen storage amount is below a reference value.

5. The engine exhaust purification device as defined in claim 4, wherein the microprocessor is further programmed to compute the maximum oxygen storage amount based on the oxygen storage amount computed when an air-fuel ratio of the exhaust from the catalyst changes to lean.

6. The engine exhaust purification device as defined in claim 1, wherein the sensor detects an air fuel ratio of the exhaust or an oxygen concentration as the exhaust characteristic.

7. An engine exhaust purification device, comprising:
   a catalyst provided in an engine exhaust passage,
   means for detecting an exhaust characteristic flowing into the catalyst,
   means for setting an oxygen storage/release rate of the catalyst according to a temperature of the catalyst,
   means for computing an oxygen storage amount of the catalyst using the detected exhaust characteristic and the oxygen storage/release rate, and
   means for computing a target air-fuel ratio of the engine based on the computed oxygen storage amount so that the oxygen storage amount of the catalyst is a predetermined target value,
   wherein the means for computing an oxygen storage amount computes the oxygen storage amount of the catalyst separately for a high-speed component which has a high oxygen storage/release rate, and a low speed component which has a slower oxygen storage/release rate than the high-speed component.

8. The engine exhaust purification device as defined in claim 7, wherein the means for setting an oxygen storage/release rate sets the oxygen storage/release rate according to the temperature and the oxygen storage amount of the catalyst.

9. A method for computing a target air-fuel ratio of an engine which has a catalyst in an exhaust passage of the engine, comprising:
   setting an oxygen storage/release rate of the catalyst according to a temperature of the catalyst,
   computing an oxygen storage amount of the catalyst using the detected exhaust characteristic and the oxygen storage/release rate, and
   computing a target air-fuel ratio of the engine based on the computed oxygen storage amount so that the oxygen storage amount of the catalyst is a predetermined target value,
   wherein the step of computing an oxygen storage amount computes the oxygen storage amount of the catalyst separately for a high-speed component which has a high oxygen storage/release rate, and a low speed component which has a slower oxygen storage/release rate than the high-speed component.

10. The method for computing a target air-fuel ratio as defined in claim 9, wherein the oxygen storage/release rate is set according to the temperature and the oxygen storage amount of the catalyst.

* * * * *